2,934,957
TEMPERATURE-SENSITIVE HEAT CONTROL UNIT

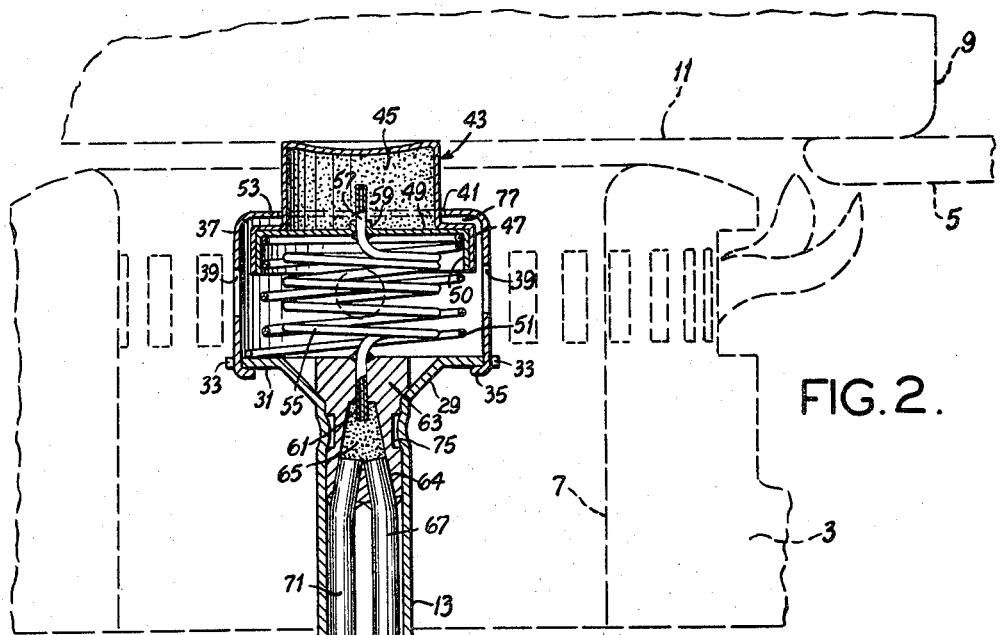

Harold C. Reinhart, Ferguson, and Walter H. Holzboog, Clayton, Mo., assignors to Micro Controls, Inc., St. Louis, Mo., a corporation of Ohio Application November 12, 1958, Serial No. 773,426

6 Claims. (Cl. 73—368)

This invention relates to temperature-sensitive heat control units, and more particularly to such units for operation with burners of gas cooking ranges and the utensils heated thereby.

Among the several objects of the invention may be noted the provision of a temperature-sensitive unit applicable to common burner structures adapted resiliently to engage a utensil for temperature response and generation of fluid pressure for the purpose of controlling the fuel delivered to the burner which is heating the vessel; the provision of a unit of the class described in which the temperature-sensitive element engaging the utensil has a convenient control means for obtaining optimum height and contact pressure with the vessel; and the provision of a control unit of the class described which is of a form adapted to conserve substantial amounts of costly materials, being therefore of low-cost construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is an isometric view illustrating the application of the invention to a bracket on a cooking range;

Fig. 2 is an enlarged vertical section taken on line 2—2 of Fig. 1; and,

Fig. 3 is a horizontal section taken on line 3—3 of Fig. 2.

Corresponding reference characters indicate corresponding parts throughout the several views of the drawings.

Referring to the drawings, numeral 1 shows a portion of a bracket such as is employed beneath one or more of its burner heads on a gas range. One such burner is illustrated in dotted lines at numeral 3. The upper end of this head 3 is usually located at some distance below the upper surface of the grates 5. The head 3 usually has a hollow portion 7, providing space for locating a temperature-sensitive control unit. The vessel which rests upon the grates 5 and which is to be heated is numbered 9. Due to the various elevations that burners such as 3 may assume with respect to the grates 5, and the various shapes that constitute the bottoms 11 of vessels such as 9, the unit requires convenient means for effecting vertical adjustments, preferably without the use of tools or other complicated means.

The unit itself is constituted by a relatively small tube 13 which may be composed of a suitable noncorroding metal such as aluminum. This tube is threaded, as shown at 15, for turning engagement through the threads of a flanged bushing 17, composed preferably of some noncorroding material such as brass or nylon. The bushing 17 is externally threaded, as shown at 19, for the reception of a lock nut 21. The threaded connection between tube 13 and bushing 17 is of a snug nature, such that the tube 13 may be turned by hand but will remain in any threaded position that it is caused to assume after turning it. The bushing 17 passes through an opening 23 in the bracket 1 and is locked in place therein by the lock nut 21. A transverse slot 25 extends from the opening 23 to the margin 27 of the bracket 1, for purposes to be described.

The upper end of the tube 13 is conically flared, as shown at 29, to form a radial flange 31 having several (for example, four) peripheral notches 33 for engagement by bent-over tabs 35 formed on the lower margin of a noncorrosive (stainless steel) inverted cup 37. This cup is provided in its sides with several aeration openings 39. In its inverted bottom is located an opening 41 for the slidable reception of a noncorrosive (stainless steel) hermetically sealed temperature-responsive element indicated generally by the numeral 43. This element has an upper crown 45 extending slidably through the opening 41, adapted for contact with the bottom 11 of the vessel 9 to be heated. Its lower stepped rim 47 is closed and hermetically sealed by a flanged plate 49. The flange 50 of element 49 and rim 47 forms a socket for the reception of compression spring 51 reacting from the plate 49 and flange 31, tending normally to bias the rim 47 against the inturned bottom portion 53 of the cup 37.

Within the spring 51 is located a short coiled tube 55, one end 57 of which is soldered into an opening 59 of the plate 49. The other end 61 is soldered into a hollow brass nipple 63. Soldered into an opening 64 leading into the hollow portion 65 is a bendable, soft copper tube 67 which leads out through the open lower end 69 of tube 13. This tube 67 from this point leads to the usual control member 70 employed in the gas control valve (not shown) for regulating the amount of gas flowing to the burner 3. The character of such control means is well known, requiring no further description.

A short pinch tube 71 is soldered into a second opening leading to the hollow portion 65 of the nipple 63, being pinched shut at its end, as indicated at 73. The control member 70, tubes 67, 71, nipple 63, coil 55 and the temperature-responsive element 43, are filled with a suitable known temperature-responsive fluid adapted to rise in pressure as the element 43 is heated, to bring about through element 70 temperature-responsive control of the gas control valve supplying the burner 3. The nipple 63 is grooved at 75, so that the tube 13 (which is thin-walled) may be lightly staked therein to permit rotary motion of the tube on the nipple while at the same time preventing them from sliding axially relative to one another.

Assembly may be accomplished by soldering the tubes 67, 71 to the nipple 63 and soldering the coil 55 to the nipple 63 and sensitive element 43. Next, the spring 61 is slipped over the tubes 67, 71 and positioned around the coil 55. The tube 13, with bushing 17 threaded thereon, is then slipped over the tubes 67, 71. Tube 67 is then soldered to the control element 70, after which liquid filling is accomplished through tube 71, which is then pinched off at 73. Next the tube 13 is lightly staked into groove 75. Finally, the cup 37 is brought into position, its initially straight tabs 35 registered with the notches 33 and then bent in as shown.

To mount the device on a bracket 1, the tube 67 is moved in through the slot 25, so that the bushing 17 may be inserted into the opening 23 and the lock nut 21 applied from below. The opening 23, being on the axis of the central opening 7 of the burner 3, supports the device centrally with respect to the burner, as shown. The elevation of element 43 may then be adjusted by hand-turning the cup 37 and tube 13. This adjusts the elevation of the sensitive element 43. The adjustment is such that when a vessel 9 is applied to the grates 5, the element 43 will be pushed down against the action of spring 51, the coil portion 55 compressing accordingly. For larger distances between bracket 1 and the vessel level 11, the tube 13 is screwed up in the bushing 17, and for smaller distances, it is screwed down. The amount of adjustment is always such that there is a clearance 77 effected between the bottom flange 53 of cup 37 and the rim 47, so that the compressive action of the spring 51 comes into play in maintaining contact between the temperature-sensitive element 43 and the bottom 11 of the vessel 9.

One of the advantages of the invention consists in the compact arrangement of the spring 51 and coil 55 in the comparatively short inverted cup 37. This conserves the amount of expensive material such as stainless steel that is required for making the cup 37, the steel in the spring and the material such as copper or stainless steel of the coil 55. The cup 37 and element 43 need to be made of noncorrosive substances so as to prevent corrosion and binding against sliding movement of element 43 in the opening 41. Material is conserved in making the coil 55, because it is relatively short as compared to longer coils used in prior constructions.

The relatively large diameter of the cup 37 with respect to the relatively small diameter of the tube 13 provides a good grip or purchase with large torque application for turning the assembly, only small torque reactive resistance being generated by the turning action of the threads 15 and the bushing 17, even with a relatively snug fit between them. Such a fit is necessary in order to maintain a given adjustment. It will be noted that when the tube 13 is turned by turning the cup 37, the remaining parts internal to these two elements 13 and 37 do not rotate extensively, since free sliding action occurs between the flange 53 and the rim 47. The need for this sliding action is another reason for construction of the elements 37 and 47 of stainless steel or the like, to prevent corrosion from interfering with the free relative motion required. It will be understood that when the adjustment is made, the vessel 9 is not in position on the grates 5, and that therefore such free sliding action is needed between parts 47 and 53 in the absence of the clearance 77. It will be observed that when the clearance 77 exists, i.e., when a vessel 9 is on the grates 5 and the burner 3 is lighted, the lateral holes 39 permit air to enter and aerate the inside of the cup 37, outward circulation occurring through the clearance 77 and opening 41.

It will be understood that when the members 13 and 37 are turned for effecting an adjustment, the temperature-responsive element 43 and coil section 55 will remain substantially nonrotary, although there may be some incipient rotary movement due to friction between the flanged portions 47 and 53. The amount of rotary movement of 43, however, is inconsequential and applies only a small twist to coil 55. As to the spring 51, it will tend to slide within the flanged plate 49 and/or the flange 31.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:
1. A temperature-sensitive heat control unit for use in connection with a gas burner above which are vessel-supporting grates; comprising a bracket under the burner and an internally threaded bushing attached to the bracket in an opening therein, an elongate comparatively small tube snugly but rotatably threaded into said bushing, the upper end of said tube being flanged outward, a hollow nipple in the upper end of the tube having means with which said tube is connected for comparatively free relative turning movements between them, a nonrotary liquid-carrying means extending through the tube and into sealed communication with the hollow nipple, a hollow inverted cup having an upper opening and being connected with said flange for rotation therewith, a substantially nonrotary liquid-carrying temperature-responsive element having a hollow portion extending through said opening and an outwardly flanged enclosure within the cup, a spring within the cup reacting between said hollow flanged portion of the temperature-responsive element and the flange of said tube, and a coiled liquid-carrying tube extending from a sealed connection with said hollow nipple to a sealed connection with the hollow temperature-responsive element, whereby the elevation of the substantially nonrotary temperature-responsive element may be adjusted by manually grasping the relatively large cup to turn the relatively small tube in the threads of said bushing.

2. A temperature-sensitive heat control unit according to claim 1, wherein said cup is provided with lateral openings adapted to admit air for aerating its interior when the temperature-sensitive element is depressed.

3. A temperature-sensitive heat control unit according to claim 1, wherein said bracket is provided with a transverse slot extending from a margin thereof to the opening therein for said nipple, whereby said liquid-carrying means in the tube may be brought into position in said opening therein.

4. A temperature-sentitive heat control unit for use in connection with a gas burner above which are vessel-supporting grates; comprising a bracket under the burner and an internally threaded bushing located and attached to the bracket in an opening therein, an elongate comparatively small tube snugly but rotatably threaded into said bushing adapted to permit and hold a manual adjustment, the upper end of said tube being flanged outward, a hollow nipple in the upper end of the tube having a groove into which said tube is lightly staked inward for comparatively free relative turning movements between them, a nonrotary liquid-carrying tubular means extending axially through and from the tube and into sealed communication with the hollow nipple, a pinched tubular member located axially in said tube and being in communication with the hollow nipple, a hollow inverted cup having an upper opening and being connected with said flange for rotation therewith, a substantially nonrotary liquid-carrying temperature-responsive element having a hollow portion extending through said opening and an outwardly flanged enclosure within the cup, a spring within the cup reacting between said hollow flanged portion of the temperature-responsive element and the flange of said tube, and a coiled liquid-carrying tube extending from a sealed connection with said hollow nipple to a sealed connection with the hollow temperature-responsive element, whereby the elevation of the substantially nonrotary temperature-responsive element may be adjusted by manually grasping the relatively large cup to turn the relatively small tube in the threads of said bushing.

5. A temperature-sensitive heat control unit according to claim 4, wherein said cup is provided with lateral openings adapted to admit air for aerating its interior.

6. A temperature-sensitive heat control unit according to claim 4, wherein said bracket is provided with a transverse slot extending from a margin thereof to the opening therein for said nipple, whereby said liquid-carrying means may be brought into position in said opening therein.

References Cited in the file of this patent
UNITED STATES PATENTS

| | | |
|---|---|---|
| 2,828,919 | Hillebrand | Apr. 1, 1958 |
| 2,892,349 | Wiberg | June 30, 1959 |